United States Patent [19]

Inui

[11] Patent Number: 4,510,819
[45] Date of Patent: Apr. 16, 1985

[54] DEVICE FOR PREVENTING REVERSE GEAR BUZZING IN A MANUAL TRANSMISSION

[75] Inventor: Masaki Inui, Toyota, Japan

[73] Assignee: Toyota Jidosha Kabushiki Kaisha, Japan

[21] Appl. No.: 479,879

[22] Filed: Mar. 29, 1983

[30] Foreign Application Priority Data

Nov. 15, 1982 [JP] Japan .................. 57-173435[U]

[51] Int. Cl.³ .................... G05G 9/12; G05G 5/10
[52] U.S. Cl. .................... 74/477; 74/411.5; 192/4 C
[58] Field of Search .............. 74/477, 526, 411.5; 192/4 C

[56] References Cited

U.S. PATENT DOCUMENTS

| | | | |
|---|---|---|---|
| 2,690,684 | 10/1954 | Stemler | 74/477 |
| 3,745,847 | 7/1973 | Worner et al. | 74/411.5 X |
| 4,221,283 | 9/1980 | Nordkvist et al. | 192/4 C X |
| 4,257,284 | 3/1981 | Ashauer et al. | 74/411.5 X |

FOREIGN PATENT DOCUMENTS

| | | | |
|---|---|---|---|
| 1159776 | 12/1963 | Fed. Rep. of Germany | 74/473 |
| 1680046 | 11/1980 | Fed. Rep. of Germany | 74/477 |
| 98451 | 8/1979 | Japan | 74/411.5 |
| 2066909 | 7/1981 | United Kingdom | 74/477 |

*Primary Examiner*—Allan D. Herrmann
*Assistant Examiner*—Shirish Desai
*Attorney, Agent, or Firm*—Parkhurst & Oliff; Parkhurst & Oliff

[57] ABSTRACT

A device for preventing reverse gear buzzing in a manual transmission comprising a transmission casing, a forward speeds unit provided with a plurality of synchromesh mechanisms, a reverse unit provided with a selective sliding mesh mechanism of a reverse idler gear and having a reverse shift head, a shift-and-select lever shaft, an inner lever attached to the shift-and-select lever shaft, an interlocking plate loosely mounted to the shift-and-select lever shaft and holding the inner lever at both ends, said interlocking plate serving to hold immovably at the neutral position the remaining shift heads other than one of said shift heads which is selected by the select operation of the inner lever, a locking means fixed to the transmission casing and adapted to hold the interlocking plate in such a manner that the interlocking plate is permitted to axially move together with the lever shaft and to rotate relative to the lever shaft, a stopper formed on the shift head adjacent to the reverse shift head and adapted to be engaged and disengaged from the inner lever and means mounted on the inner lever for abutting against the locking means at the reverse select position of the inner lever in such a manner that after abutting of the abutting means against the locking means the inner lever is permitted to slightly move in the shift and select directions and subsequently move only in the shift direction.

8 Claims, 12 Drawing Figures

4,510,819

DEVICE FOR PREVENTING REVERSE GEAR BUZZING IN A MANUAL TRANSMISSION

BACKGROUND OF THE INVENTION

The present invention relates to a device for preventing reverse gear buzzing in a manual transmission.

As a reverse shifting operation in a manual transmission is conducted generally when the vehicle is stopped, in most cases reverse gear change has been performed by a selective sliding mesh unit of the reverse idler gear and no synchromesh unit has been provided. Thus, especially at the quick reverse gear change, the input shaft continues its inertial rotation to cause the clash of each gear when the reverse idler gear is meshed with a reverse gear, resulting in gear buzzing and consequently unpleasant feeling of the driver, and sometimes the shift feeling becomes worse, or the gear teeth may be broken in the worst case. As simple means for preventing the gear buzzing, there has been proposed an individual synchromesh unit for the reverse, but it is difficult to obtain a space for mounting the synchromesh unit and the provision of the unit increases in cost and weight, so such an individual synchromesh unit for the reverse will result in an undesirable means.

SUMMARY OF THE INVENTION

Accordingly, it is a primary object of the present invention to provide a device for preventing reverse gear buzzing caused by the meshing noise of the reverse idler gear at the reverse gear change, so as to eliminate unpleasant gear buzzing as well as to improve the shift feeling.

It is another object of the present invention to provide a device for preventing reverse gear buzzing which is compact, inexpensive and lighter in comparison with the means having an individual synchromesh unit for the reverse.

According to the present invention, a device for preventing reverse gear buzzing in a manual transmission comprises a transmission casing, a forward speeds unit provided with a plurality of synchromesh mechanisms and having shift heads for the forward speeds, a reverse unit provided with a selective sliding mesh mechanism of a reverse idler gear and having a reverse shift head, a shift-and-select lever shaft mounted in the transmission casing, an inner lever attached to the shift-and-select lever shaft, an interlocking plate loosely mounted to the shift-and-select lever shaft and holding the inner lever at its both ends, said interlocking plate serving to hold immovable at the neutral position the remaining shift heads other than one of said shift heads which is selected by the select operation of the inner lever, a locking means fixed to the transmission casing and adapted to hold the inter locking plate in such a manner that the interlocking plate is permitted to axially move together with the lever shaft and to rotate relative to the lever shaft, a stopper formed on the shift head adjacent to the reverse shift head and adapted to be engaged with and disengaged from the inner lever and means mounted on the inner lever for abutting against the locking means at the reverse select position of the inner lever in such a manner that after abutting of the abutting means against the locking means the inner lever is permitted to slightly move in the shift and select directions and subsequently move only in the shift direction, whereby the reverse shift head and the shift head adjacent thereto are moved together slightly in the shift direction because of engagement of the interlocking plate with the reverse shift head and the stopper, and thereafter the reverse shift head along is moved in the shift direction because of disengagement of the interlocking plate from the stopper and engagement thereof only with the reverse shift head.

With this arrangement, the synchronizing effect of the synchromesh unit for the forward speeds which is shifted in the same direction as the reverse shift direction may be utilized for the reverse shifting operation, thereby stopping or slowing down the inertial rotation of the input shaft.

The invention will become more fully apparent from the claims and the description as it proceeds in connection with the drawings.

DETAILED DESCRIPTION OF THE PREFERRED EMBODIMENTS

Figure 1:
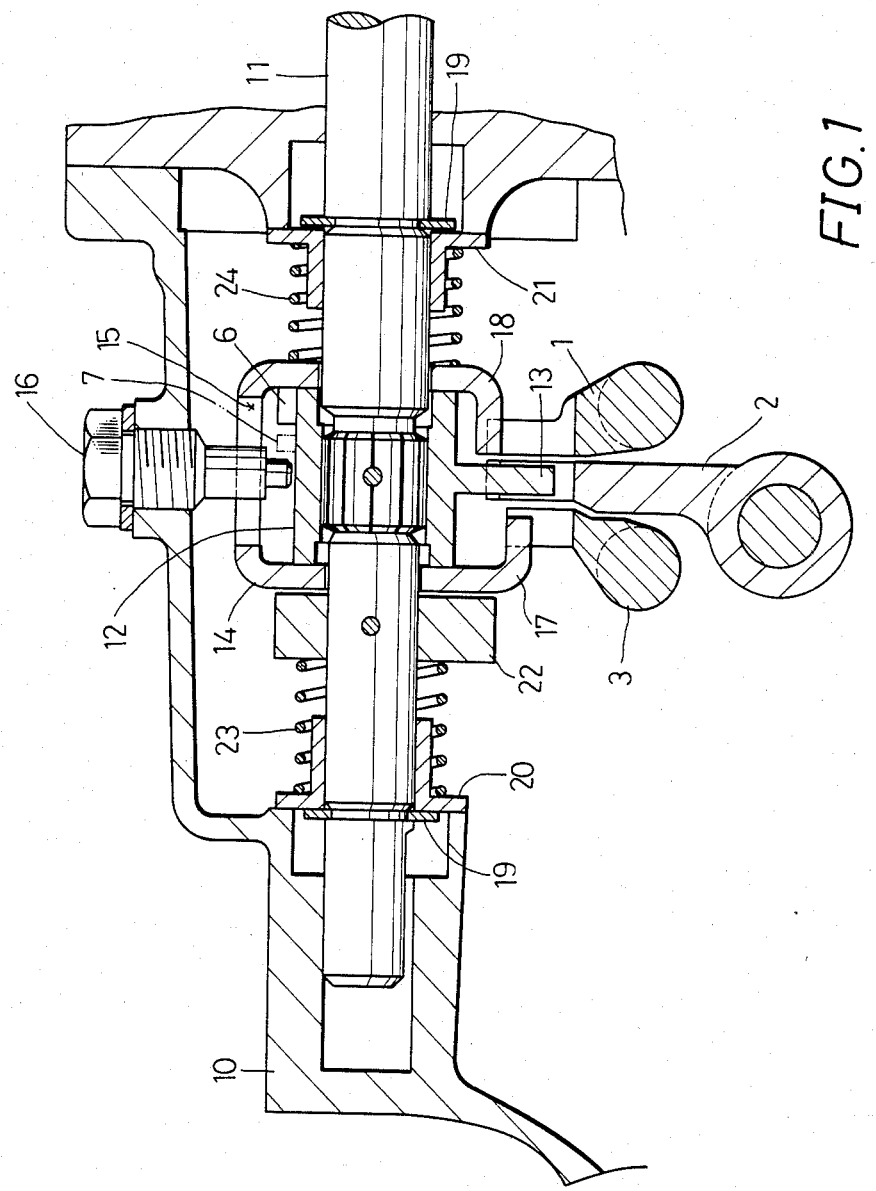
FIG. 1 is a front view of a shift-and-select mechanism in a manual transmission of an embodiment according to the present invention.
Figure 2:
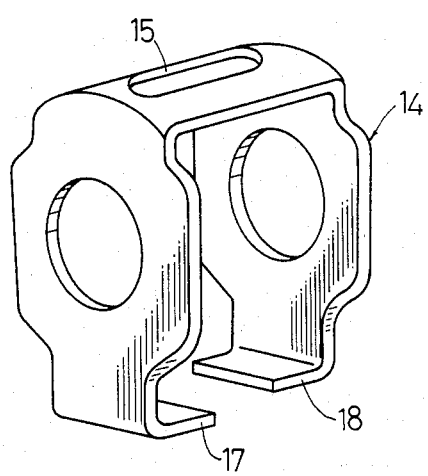
FIG. 2 is a perspective view of an interlocking plate.

Referring now to FIG. 1 which shows a shift-and-select mechanism in a manual transmission including five forward speeds and a reverse, provided with a first/second speeds synchromesh unit, a third/fourth speeds synchromesh unit, a fifth speed synchromesh unit and a selective sliding mesh unit of a reverse idler gear. The shift-and-select mechanism which is put in its neutral position in FIG. 1 has a transmission casing 10 and a shift-and-select lever shaft 11 mounted in the casing 10. An inner lever 12 is attached to the lever shaft 11 and has a projection 13 at the lower end thereof and a second shift head 2 is engaged with the projection 13. A first shift head 1 is disposed on the right-hand side of the second shift head 2 and a third shift head 3 is disposed on the left-hand side of the second shift head 2 as viewed in FIG. 1. The first shift head 1 is connected to the first/second speeds synchromesh unit, the second shift head 2 to the third/fourth speeds synchromesh unit, and the third shift head 3 to the fifth speed synchromesh unit and the selective sliding mesh unit for the reverse. By axial movement or selecting operation of the shift-and-select lever shaft 11, the projection 13 of the inner lever 12 is selectively engaged with one of the shift heads 1, 2 and 3, and the selected shift head is slided forwardly or backwardly by rotation or shifting operation of the lever shaft 11 to perform a speed change operation. In other words, six speeds change may be obtained by backward movement of the first shift head 1 for the first speed, forward movement of the first shift head 1 for the second speed, backward movement of the second shift head 2 for the third speed, forward movement of the second shift head 2 for the fourth speed, backward movement of the third shift head 3 for the fifth speed and forward movement of the third shift head 3 for the reverse The manual transmission is provided with an interlocking unit as will be hereinafter described. An interlocking plate 14 shown in FIG. 2 is relatively rotatably attached to the shift-and-select lever shaft 11, surrounding the inner lever 12. In other words, the interlocking plate 14 holds the inner lever 12 at its both ends and the lever shaft 11 is loosely inserted into the interlocking plate 14 in such a manner as to permit the rotation of the lever shaft 11. The interlocking plate 14 has at the upper surface thereof an elongated slot 15. A lock bolt 16 is threadedly attached to the upper surface of the transmission casing 10 and the shank of the lock bolt 16 protrudes into the slot 15 in such a manner that the interlocking plate 14 is permitted to axially move together with the lever shaft 11 but is prohibited to rotate relative to the transmission casing 10. The interlocking plate 14 has right and left lock members 18 and 17 facing to each other at its lower portion. When one of the shift heads 1, 2 and 3 is engaged with the inner lever 12, the other two shift heads are held immovable in this way at the neutral position of the shift operation, simultaneous shifting to two shift heads or double shifting is prevented. Right and left E-rings 19 are secured on the shift-and-select lever shaft 11, and right and left seats 20 and 21 are slidably disposed on the lever shaft 11. A holding lever 22 is fixed on the lever shaft 11. A left return spring 23 is interposed between the left seat 20 and the holding lever 22, and a right return spring 24 is interposed between the interlocking plate 14 and the right seat 21.

Figure 3:
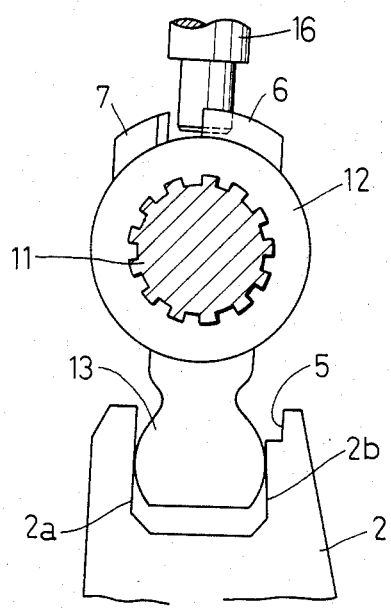
FIG. 3 is an enlarged side elevational view of an inner lever.
Figure 4:
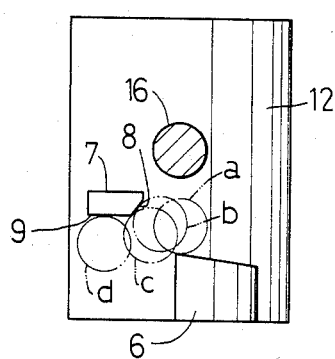
FIG. 4 is an enlarged plan view of the inner lever in connection with the relative movement of the lock bolt.
Figure 5:
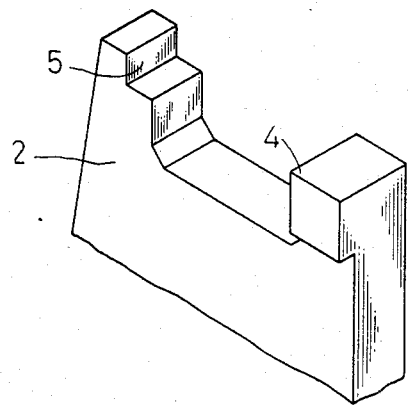
FIG. 5 is a perspective view of the reverse shift head.
Figure 6:
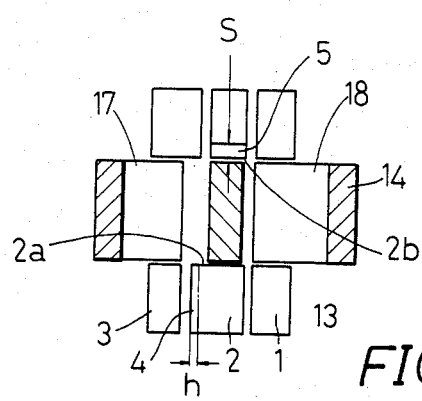
FIGS. 6 to 9 are plan views illustrating the engagement of the inner lever and the interlocking plate with the shift heads in the order of the operational steps of the reverse shift.

Now the description will refer to the device for preventing reverse gear buzzing provided in the above manual transmission. The second shift head 2 has a front engaging surface 2a adjacent to the reverse shift head or the third shift head 3, and a stopper 4 having a height of h projects from the front engaging surface 2a and is adapted to be engaged with the inner lever 12 together with the third shift head 3 upon reverse shifting operation. (See FIG. 6.) The second shift head 2 has a rear engaging surface 2b provided with a notch 5 which is adapted to define a clearance S relative to the lock member 18 of the interlocking plate 14. (See FIGS. 3, 5 and 6.) The inner lever 12 has at the upper surface thereof a catch projection 6 adapted to abut against the lower end of the lock bolt 16 upon the fifth speed or the reverse selecting operation and a plate-like guide projection 7 which is guided by the lock bolt 16 upon the reverse shifting operation. (See FIGS. 3 and 4.) The catch projection 6 is of a block-like shape and the abutting portion to the lock bolt 16 is formed into an edge-like shape. The guide projection 7 has a bevel 8 for permitting the inner lever 12 to be moved by a predetermined amount in the select and shift directions and a guide surface 9 for guiding a subsequent shift movement of the inner lever 12. The lock bolt 16 relatively slides along the bevel 8 upon the reverse shifting operation and the inner lever 12 is pushed leftwardly as viewed in FIG. 4 and thus the projection 13 of the inner lever 12 is disengaged from the stopper 4. The disengagement occurs just before the clearance S is filled up by the reverse shift, so as to get only the synchronizing effect of the synchromesh unit by means of the second shift head 2 but to avoid double shifting to the fourth speed and the reverse. The double shifting can be also avoided by filling up of the clearance S. Phantom lines a to d in FIG. 4 indicate the trace of the relative movement of the lock bolt 16 relative to the inner lever 12 shifted into the reverse position. The right lock member 18 is arranged on a level higher than the left lock member 17 so as to prevent rattling of the second shift head 2 caused when the inner lever 12 is shifted into the first or the second speed position by the notch 5 of the second shift head 2 which notch allows dependent movement of the second shift head 2 upon the reverse shifting operation.

Figure 7:
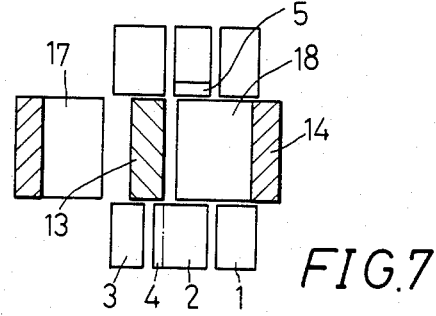
Figure 8:
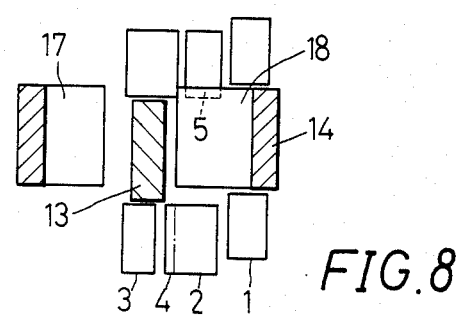
Figure 9:
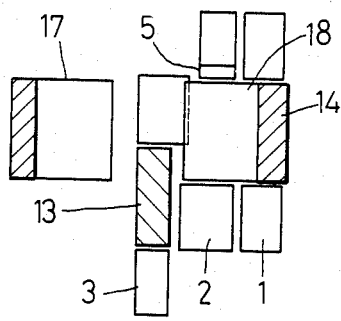
Figure 10:
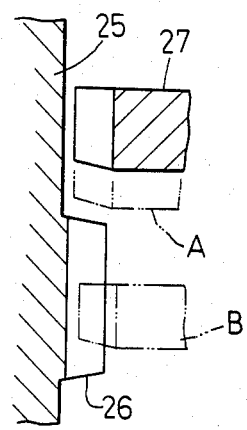
FIG. 10 is a sectional view of a reverse gear and a reverse idler gear in the neutral position.

In operation of the device for preventing reverse gear buzzing constructed above, the positional relationship of the projection 13 of the inner lever 12 and the lock members 17 and 18 of the interlocking plate 14 relative to the shift heads 1, 2 and 3 will be described in the order of operations, referring to FIGS. 6 to 9. In the neutral position shown in FIG. 6, the lock bolt 16 is positioned substantially above the center of the inner lever 12 (See FIG. 4.), and the reverse idler gear 27 stands waiting for meshing with a reverse gear 26 on an input shaft 25 as shown in FIG. 10. When the shift-and-select lever shaft 11 is selected to the fifth speed and the reverse positions, the projection 13 of the inner lever 12 is moved to engage with the third shift head 3 as well as the stopper 4 of the second shift head 2 as shown in FIG. 7, and at this time the lock bolt 16 is abutted against the catch projection 6 of the inner lever 12. (See the phantom line a in FIG. 4.) Then, when the lever shaft 11 is shifted into the reverse position, the third shift head 3 is moved or shifted together with the second shift head 2 by the projection 13 of the inner lever 12, and the lock bolt 16 is abutted against the top end of the bevel 8 of the guide projection 7 (See the phantom line b in FIG. 4.), and slides along the bevel 8 to leftwardly move the inner lever 12. When the lock bolt 16 reaches the lower end of the bevel 8 as shown by the phantom line c in FIG. 4, the projection 13 of the inner lever 12 is disengaged from the stopper 4 of the second shift head 2 as shown in FIG. 8. The above movement of the second shift head 2 by means of the inner lever 12 gives the synchronizing effect to stop or slow down the inertial rotation of the input shaft 25. At this time, the reverse idler gear 27 is at the position shown by the phantom line A in FIG. 10 and not yet starting meshing with the reverse gear 26. As the reverse shifting operation is further continued, the projection 13 of the inner lever 12 moves only the third shift head 3 (See FIG. 9 where the shifting is completed.) to mesh the reverse idler gear 27 with the reverse gear 26 as shown by the phantom line B in FIG. 10, and now the reverse shifting operation is completed. The reverse idler gear 27 is meshed with a reverse driven gear on an output shaft at the same time when it is meshed with the reverse gear 26. When the inner lever 12 finished the reverse shifting operation, the lock bolt 16 is relatively moved to the position shown by the phantom line d in FIG. 4 in relation to the inner lever 12. In order to return the inner lever 12 from the reverse position into the neutral position, each member is restored to its original position by reversing the procedure outlined above.

Figure 11:
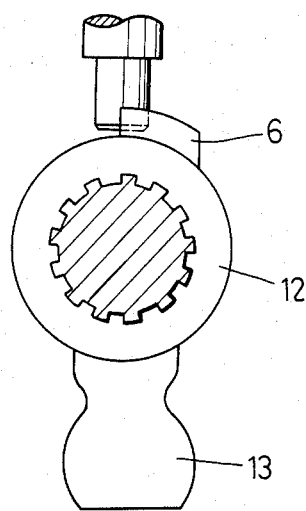
FIG. 11 is a side elevational view of a modified inner lever.
Figure 12:
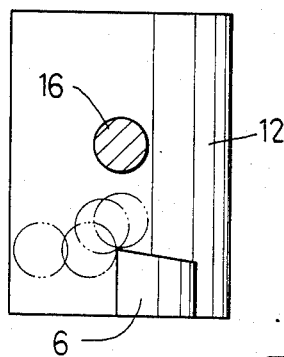
FIG. 12 is an enlarged plan view of the inner lever of FIG. 11 in connection with the relative movement of the lock bolt.

In the above embodiment, the inner lever 12 is provided with the guide projection 7 which is adapted to forcibly move the inner lever 12 when shifted into the reverse position. The guide projection 7 may be, however, eliminated, as is shown in FIGS. 11 and 12. The phantom line in FIG. 12 indicates the trace of the relative movement of the lock bolt 16 during the reverse shifting operation.

While the invention has been described with reference to a few preferred embodiments thereof, it is to be understood that modifications or variations may be easily made without departing from the scope of the present invention which is defined by the appended claims.

What is claimed is:

1. A device for preventing reverse gear buzzing in a manual transmission comprising:
   a transmission casing;
   a forward speeds unit provided with a plurality of synchromesh mechanisms and having shift heads for the forward speeds;
   A reverse unit provided with a selective sliding mesh mechanism of a reverse idler gear and having a reverse shift head;
   a shift-and-select lever shaft mounted in said transmission casing;
   an inner lever attached to said shift-and-select lever shaft;
   an interlocking plate loosely mounted to said shift-and-select lever shaft and holding said inner lever at its both ends, said interlocking plate serving to hold immovable at the neutral position the remaining shift heads other than one of said shift heads which is selected by the select operation of said inner lever;
   a locking means fixed to said transmission casing and adapted to hold said interlocking plate in such a manner that said interlocking plate is permitted to axially move together with said lever shaft and to rotate relative to said lever shaft;
   stopper formed on the shift head adjacent to said reverse shift head and adapted to be engaged with and disengaged from said inner lever; and
   means mounted on said inner lever for abutting against said locking means at the reverse select position of said inner lever in such a manner that after abutting of said abutting means against said locking means said inner lever is permitted to slightly move in the shift and select directions and subsequently move only in the shift direction, whereby said reverse shift head and said shift head adjacent thereto are moved together slightly in the shift direction because of engagement of said interlocking plate with said reverse shift head and said stopper, and thereafter said reverse shift head alone is moved in the shift direction because of disengagement of said interlocking plate from said stopper and engagement thereof only with said reverse shift head.

2. The device as defined in claim 1, wherein said abutting means is of a block-like shape and an end portion of said abutting means abutted against said locking means is formed into an edge-like shape.

3. The device as defined in claim 1, wherein said locking means is a bolt.

4. The device as defined in claim 1 and further comprising a guide member attached on said inner lever and having an end portion abutting against said locking means upon a predetermined amount of select and shift movements of said inner lever after said abutting means is disengaged from said locking means and having a guide surface for guiding a subsequent shift movement of said inner lever.

5. The device as defined in claim 4, wherein said guide member is of a plate-like shape.

6. The device as defined in claim 4, wherein said end portion of said guide member includes a bevel surface to permit said locking means to be slided thereon and consequently to permit said inner lever to be moved by a predetermined amount in the select and shift directions.

7. The device as defined in claim 1, wherein said interlocking plate includes a first and a second lock members oppositely arranged with each other and adapted to be engaged with said shift heads, said first lock member being disposed adjacent to said reverse shift head and arranged farther away from said shift-and-select lever shaft than said second lock member.

8. The device as defined in claim 1, wherein said shift head having said stopper is provided with a notch for prohibiting said shift head from contacting with said second lock member of said interlocking plate.

* * * * *